United States Patent [19]
Chevalier et al.

[11] Patent Number: 5,235,639
[45] Date of Patent: Aug. 10, 1993

[54] PROGRAMMABLE COMMUNICATION CONTROLLER LINE ADAPTER AND METHOD FOR PROGRAMMING LINE ADAPTER

[75] Inventors: Denis Chevalier, La Colle sur Loup; Jean Gallian, Cagnes sur mer; Michel Geneste, Plan de Cuques; Patrick Massi, Saint Laurent du Var; Guy Platel, La Gaude, all of France

[73] Assignee: International Business Machines Corp., Armonk, N.Y.

[21] Appl. No.: 895,978

[22] Filed: Jun. 9, 1992

[30] Foreign Application Priority Data

May 31, 1991 [EP] European Pat. Off. ........ 91480087.5

[51] Int. Cl.⁵ .................... H04L 9/32; G06F 13/14
[52] U.S. Cl. ........................... 380/4; 380/21; 380/49; 395/325; 364/238.5; 364/242.94
[58] Field of Search ............... 380/4, 49, 21, 50, 20; 364/242.94, 238.5; 395/325

[56] References Cited

U.S. PATENT DOCUMENTS

| | | |
|---|---|---|
| 3,806,882 | 4/1974 | Clarke . |
| 4,837,677 | 6/1989 | Burrus, Jr. et al. ............... 364/200 |
| 4,901,348 | 2/1990 | Nichols et al. .................. 380/49 X |
| 4,924,513 | 5/1990 | Herbison et al. ................... 380/21 |
| 4,961,224 | 10/1990 | Yung .............................. 380/4 X |
| 4,965,828 | 10/1990 | Ergott, Jr. et al. . |
| 5,073,933 | 12/1991 | Rosenthal ....................... 380/4 X |
| 5,144,664 | 9/1992 | Esserman et al. .................. 380/20 |
| 5,161,192 | 11/1992 | Carter et al. .................. 380/49 X |

FOREIGN PATENT DOCUMENTS

| | | |
|---|---|---|
| 0115348 | 8/1984 | European Pat. Off. . |
| 0260458 | 3/1988 | European Pat. Off. . |
| 0348053 | 12/1989 | European Pat. Off. . |

OTHER PUBLICATIONS

Patent Abstracts of Japan, vol. 9, No. 210 (p-383) (1933) Aug. 28, 1985, Appl. No. 58-180004.

Primary Examiner—Gilberto Barrón, Jr.
Attorney, Agent, or Firm—Edward H. Duffield

[57] ABSTRACT

A communication controller CCP includes line adapters (104-i) each having a storage which is loaded with a general application program during an initialization phase. The line adapters allow the attachment and the communication of different telecommunication entities, e.g. a LAN, a teleprocessing line etc. . . The CCP is connected by means of a control adapter to a local control terminal (100) which is associated with a storage for storing the different general application programs which are likely to be required by the different line adapters. A storage contains an access key comprising data relative to the types and the number of line adapters of any type which are authorized to be loaded with the general application program stored in the storage controlled by the control terminal. The CCP also has logic for checking whether a loading request received from one adapter complies with the contents of the stored access key in order to prevent the loading of an unauthorized line adapter. A method is disclosed for performing the loading of a line adapter card which is attached to a communication controller product CCP, the line adapter card being loadable with a general application program during an initialization phase. The method includes the steps of receiving a request from a determined line adapter to be loaded with the corresponding general application program which is loaded in its said storage, and of checking whether the requesting line adapter is included in a list of line adapters which are authorized to be loaded with their corresponding general program application. The method further includes checking whether the number of already defined line adapters which are of the same type as the one which requests the loading operations does not exceed a predetermined value, and of eventually preventing the loading of the requesting line adapter in the case when one of the preceding conditions is not satisfied.

9 Claims, 5 Drawing Sheets

PROGRAMMABLE COMMUNICATION CONTROLLER LINE ADAPTER AND METHOD FOR PROGRAMMING LINE ADAPTER

TECHNICAL FIELD

The present invention relates to a communication controller product (CCP) which includes line adapters. Each line adapter having a storage which is loaded with a general application program during an initialization phase prior to the data communication phase. The line adapter allows the attachment of and the communication to different telecommunication entities, such a Local Area Network, a teleprocessing line etc. . . The invention particularly relates to a communication controller product (CCP) which is connected to a local control terminal associated with a large storage for storing the different general application programs which are likely to be transferred and loaded into the different line adapters which are possibly attached.

PRIOR ART

Figure 1:
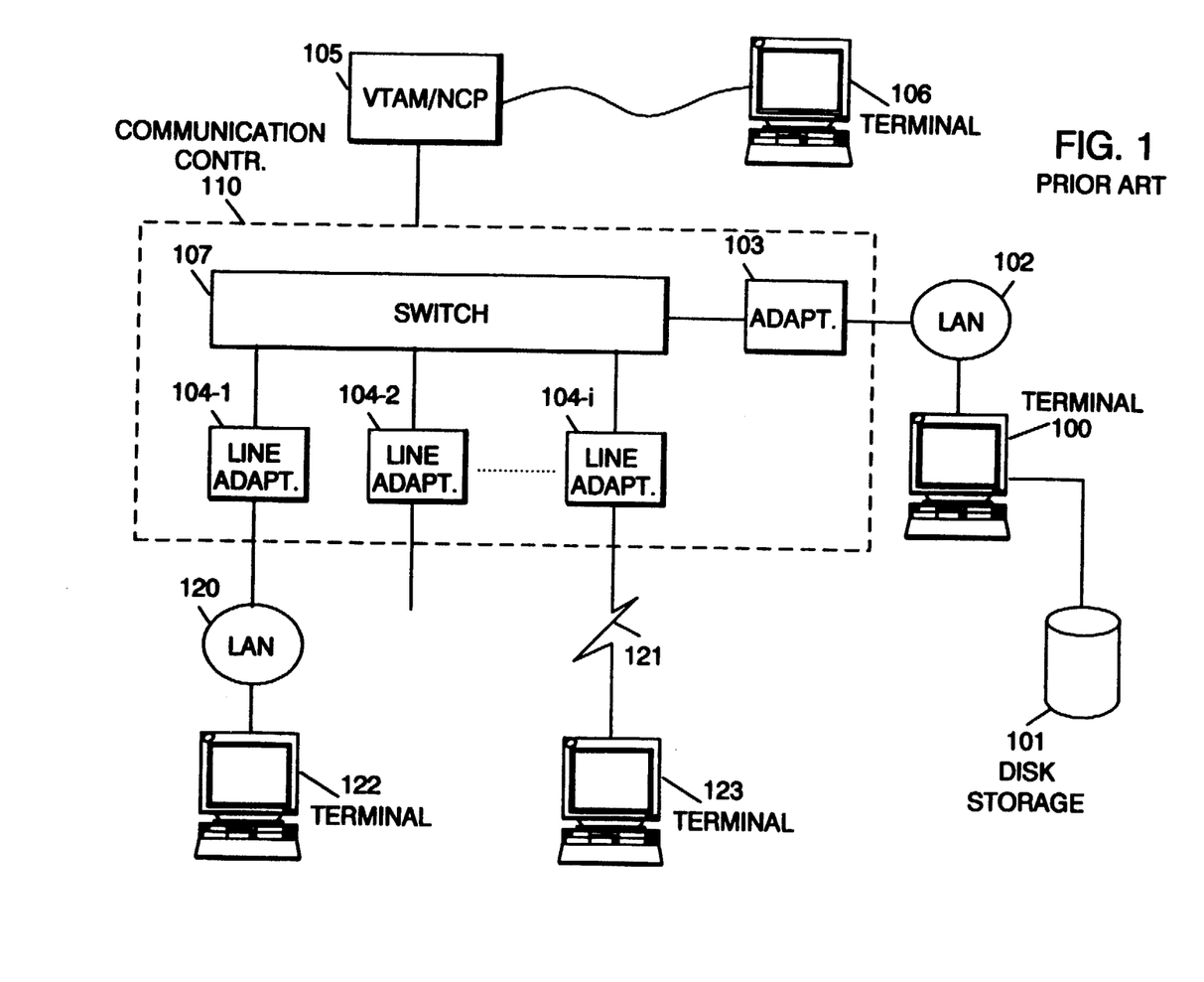
FIG. 1 illustrates a typical prior art telecommunication architecture

Telecommunications networks generally involve the connection of a large number of telecommunication products in order to allow data communication in compliance with the customers' requirements. FIG. 1 shows a typical and known architecture of a telecommunication network. A host computer 105 is loaded with a network control software such as the IBM Corporation's VTAM or NCP ("Virtual Teleprocessing Access method" or "Network Control Program") which are widely used in the telecommunication field. Host computer 105 is generally connected to a communication controller product (CCP) 110 which allows the attachment of different units to the telecommunication network: a Local Area Network (LAN) or Token ring 120 to which is particularly connected a terminal 122, a teleprocessing line 121 such as Integrated Service Digital Network (ISDN), a T1 line, X25, RVX etc. . . The host computer 105 is under control of a user by means of a network control terminal 106 while CCP 110 can be controlled via a control terminal 100 through a Local Area Network 102.

As will be explained hereinafter, control terminal 100 is associated with a disk storage 101. Communication controller product 110 includes switching means 107 to which are connected a set of Line Adapter cards 104-1, 104-2. . . 104-i allowing the attachment of different external lines (the figure shows only the attachment of LAN 120 and teleprocessing line 121 for purposes of simplicity) in accordance with the requirements of the user. It also shows an adapter card 103 for the connection of LAN network 102 to the CCP.

Adapter card 103 permits control terminal 100 to communicate with CCP 110 via LAN network 102. The switching means 107 permits the communication between the different adapters which are attached thereto by means of their corresponding line adapter cards 104-1 . . . 104-i. Therefore the system facilitates communication between the different terminals 122, 123. . . which are connected to the telecommunication network.

A user who wishes to build a telecommunication network complying with his requirements buys a communication controller product 110 and adds to the latter the appropriate line adapters 104-1, 104-2, . . . 104-i according to the type of external line to which they are intended to be connected (LAN, teleprocessing line etc. . .). Line adapters 104-1, 104-i generally include some storage means and particularly a first PROM storage having a relatively small storage capacity and a second RAM storage which, conversely, has a relatively large storage capacity. The PROM storage is intended to receive simple, elementary microcode software for initialization purposes, while the large RAM storage is intended to store the general application program microcode used for controlling the telecommunication between the adapter and CCP 107. The general application program is loaded from disk storage 101 via LAN 102 and adapter 103.

The storage of the general application program in a RAM is advantageous because, firstly, a RAM requires less volume and is cheaper than the corresponding PROM storage having an equivalent capacity. Secondly, update and maintenance operations are more easily made and only require updating of the contents of storage 101. Initialization of every line adapter 104-i will entail the loading of the application program, and particularly the loading of the RAM storage included therein, with the updated general application program.

It should be noticed that only the general application program corresponding to a determined type of line adapter 104-i is transferred and loaded into that line adapter (that is to say a LAN line adapter receives microcode corresponding to a LAN general application program, an ISDN line adapter receives microcode corresponding to a ISDN general application program etc. . . ).

For the sake of simplicity and economy, it is advantageous for telecommunication suppliers to provide all customers with identical unique software loaded into storage 101 irrespective of the actual architecture of the particular customer, and particularly with regard to the existence of ISDN line adapters, LAN line adapters, T1 line adapters etc. . . When the telecommunication controller product 110 is powered ON, an initial program loading step is performed during which each of the line adapters 104-i is recognized and identified and then loaded with the appropriate portion of the software existing in disk storage 101 via LAN 102, adapter 103 and the switching means 107. Thus, the general application program which corresponds to the type of adapter which has been identified is loaded. Once every line adapter 104-i has been loaded with its corresponding general application program, the communication of data between the different units which are attached to the CCP 110 is enabled.

Since however, the telecommunication suppliers charge a given customer on the basis of its actual use of the software stored in storage 101, it is highly desirable to prevent any indelicate customer from using an unauthorized part of the software stored therein.

OBJECTS OF THE INVENTION

An object of the invention is to provide an improved communication controller product CCP which has line adapters loaded with general application programs and a method for loading line adapters which are attached to a communication controller product, in which it is made impossible for one customer to load a line adapter which has not been recognized by the manufacturer of the CCP as being an authorized line adapter.

BRIEF SUMMARY OF THE INVENTION

According to the present invention, the object is achieved by providing a communication controller which includes means for storing an access key comprising data relative to the types and the number of line adapters (104-i) of each type which are authorized to be loaded with the general application program which exists in the storage which is associated to control terminal, and means for checking whether a loading request received from one adapter complies with the contents of its stored access key, thereby enabling prevention of loading of any unauthorized line adapter.

More precisely, the invention comprises a communication controller product CCP (110) which includes line adapters having each a storage which is loaded with a general application program during an initialization phase, said line adapters allowing the attachment of and the communication with different telecommunication entities, such as a LAN, a teleprocessing line etc. . . . The CCP is connected by means of a control adapter to a local control terminal which is associated with a mass data storage for storing the different general application programs which are likely to be required by said line adapters. The communication controller product is characterized in that it includes means for storing an access key comprising data relative to the types and the number of line adapters of each type which are authorized to be loaded with the general application program transferred from the storage associated with said control terminal. The CCP also has means for checking whether a loading request received from one line adapter complies with the contents of said stored access key, thereby enabling prevention of the loading of an unauthorized line adapter.

In a preferred embodiment, the access key may be encrypted and comprises data relative to the serial number of the communication controller which is associated with the list of authorized line adapters. That permits an easy checking of the serial number of the communication controller to prevent any abuse of the system.

Preferably, the communication controller includes means for performing a decryption process of the encrypted access key, the decrypted access key being then stored into a non volatile storage. The decryption process involves a first software decryption routine which is stored in a RAM and a second decryption process which is performed by a wired decryption logic which is located on a card which controls the power ON of the machine. That results in a increased protection of the decryption process against any unauthorized analysis.

The solution of the above problem is also embodied in the method according to the invention for performing the loading of a line adapter which is attached to a communication controller product CCP and which allows the connection of a telecommunication entity such as a LAN, a teleprocessing line etc. . . , said line adapter being loaded during an initialization phase with a corresponding general application program which exists in a storage associated with a control terminal and can be transferred into the line adapter. The method according to the present invention is characterized in that it involves steps of receiving a request from a line adapter to be loaded with the corresponding general application program, and checking whether the requesting line adapter is included in a list of line adapters which are authorized to be loaded with their corresponding general program application. Then, the method involves the step of checking whether the total number of line adapters which are of the same type as the one which requests the loading operations does not exceed a predetermined value, and of preventing the loading of the requesting line adapter in the case when one of the preceding conditions is not satisfied.

DETAILED DESCRIPTION OF THE PREFERRED EMBODIMENT OF THE INVENTION

Figure 2:
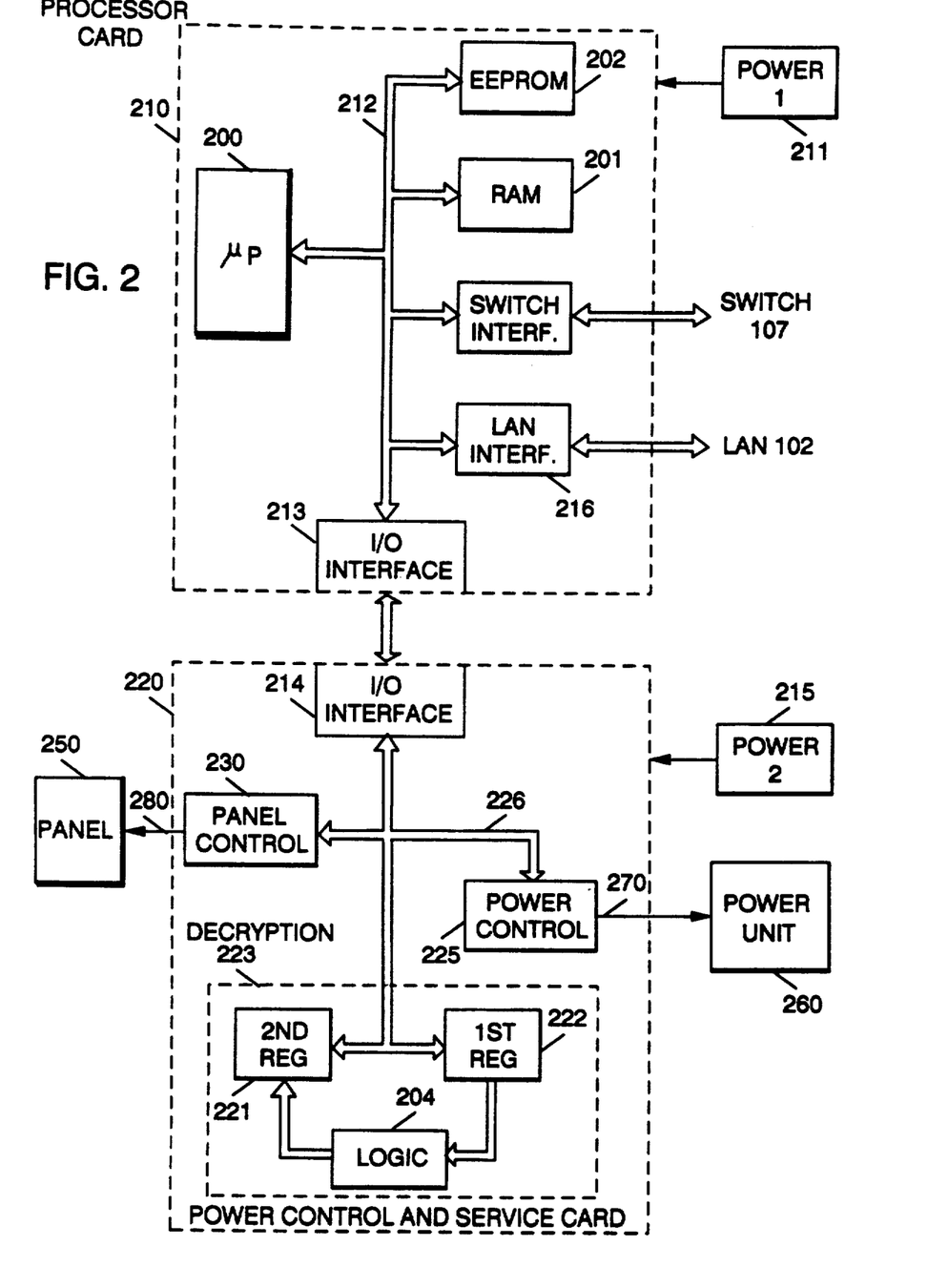
FIG. 2 illustrates the structure of an adapter 103 in accordance with the present invention.

In accordance with the present invention, the communication controller product 110 comprises an adapter 103 which is detailed with respect to FIG. 2. Adapter 103 includes a first processor card 210 and a second Power Control and Service card 220 having, respectively, power supply units 211 and 215. Processor card 210 includes a processor 200 which is connected by means of a bus 212 to a EEPROM 202, to a RAM 201, to a switch interface circuit which is connected to switch 107, to a LAN interface 216 allowing the communication between LAN 102 and processor card 210, and also to a I/O interface circuit 213. EEPROM 202 is a storage of low capacity which is loaded with a small piece of microcode, and particularly a bootstrap code which is required to perform and complete an initial program loading phase during which an initialization procedure provides the loading of RAM storage 201 with the required microcode which will be used for the data communication operations and the encryption/decryption process described hereinafter. During the initialization procedure, the loading of RAM 201 is performed by means of a transfer of data from storage 101 via control terminal 100, LAN 102 and LAN interface 216.

Processor card 210 communicates with power control and service card 220 by means of a bus 203 comprising the required data, address and control busses, the latter bus 203 being connected to I/O interface 213 and a I/O interface 214 located into card 220. I/O 214 permits processor 200 to control a panel control unit 230, an encryption device 223 and a power control unit 225 located in card 220 by means of a bus 226. Card 220 is connected to every line adapter 104-i by means of two leads (not shown in FIG. 2). A first lead carries a signal which is used during the initialization procedure to inform processor 200 that a line adapter 104-i is actually present in one slot. A second lead is used for reset purpose whereby processor 200 is able to independently reset any one of the line adapters 104-1, 104-2, . . . 104-i, that is to say to start the reset microcode loaded in EEPROM 303 located in that particular line adapter. Therefore, if a problem of failure occurs in one line adapter, processor 200 is advantageously able to reset and reinitialize that particular line adapter 104-i without disturbing the others.

Panel control unit 230 located in card 220 manages a panel 250 by means of leads 280 and is particularly used for controlling a (not shown) display and keyboard located in that panel. Consequently, processor 200 is able to display messages and information which relate to the general working of CCP 110 and also to read the data entered on the panel and which have been stored in registers located in panel control 230.

Processor card 210 and card 220 are continuously powered by means of units 211 and 215 while the remainder of the communication controller 110, and particularly the switching means 107 and the line adapters 104-i are supplied with DC current only when power control unit 225 turns on power unit 260.

For this purpose, power control unit 225 includes a set of drivers (not shown) for supplying the current needed to drive a set of relays located in power unit 260. Therefore, the general powering ON of the machine is under control of processor 200 and can be achieved by two distinctive ways: locally or remotely. The powering ON of the machine can be performed locally if the user enters a power-ON command directly via panel 250. Alternatively, the powering ON can also be achieved remotely by means of a power-ON command which is transmitted from control terminal 100 to processor 200 via LAN 102 and LAN interface 216.

Once, the power-ON command has been received by processor 200, a corresponding power-ON command is transmitted to power control unit 225 via I/O interface 213, bus 203, I/O interface 214 and bus 226. The latter command is then decoded by unit 225 which generates a driving current which is transmitted via lead 270 to the relays located in power unit 260.

The Power Control and Service card further comprises an encryption circuit 223 which includes a first register 222 having an input connected to bus 226 and a second register 221 having an output connected to bus 226. Moreover, register 222 has an output which is connected to the input of a logic circuit 204, the output of which being connected to an input lead of register 221. Logic circuit 204 includes a set of logic components which are wired so as to perform a decryption of an N-bit word. In the preferred embodiment, registers 221 and 222 are 16-bit registers so that logic circuit 204 performs a decryption of 16 bit-words. Logic circuit 204 basically includes a set of AND, OR and INVERTing circuits which are connected so as to provide the required encryption transfer function. Any combination of the bits of the 16 bit-word in order to build another 16 bit-word can be used. Below is an example of a decryption key:

Assuming that the 16-bit word stored in register 222 is

ABCDEFGHIJKLMNOP the decrypted 16-bit word which is stored in register 221 can be

A'B'C'D'E'F'G'H'I'J'K'L'M'N'O'P' with

Figure 3:
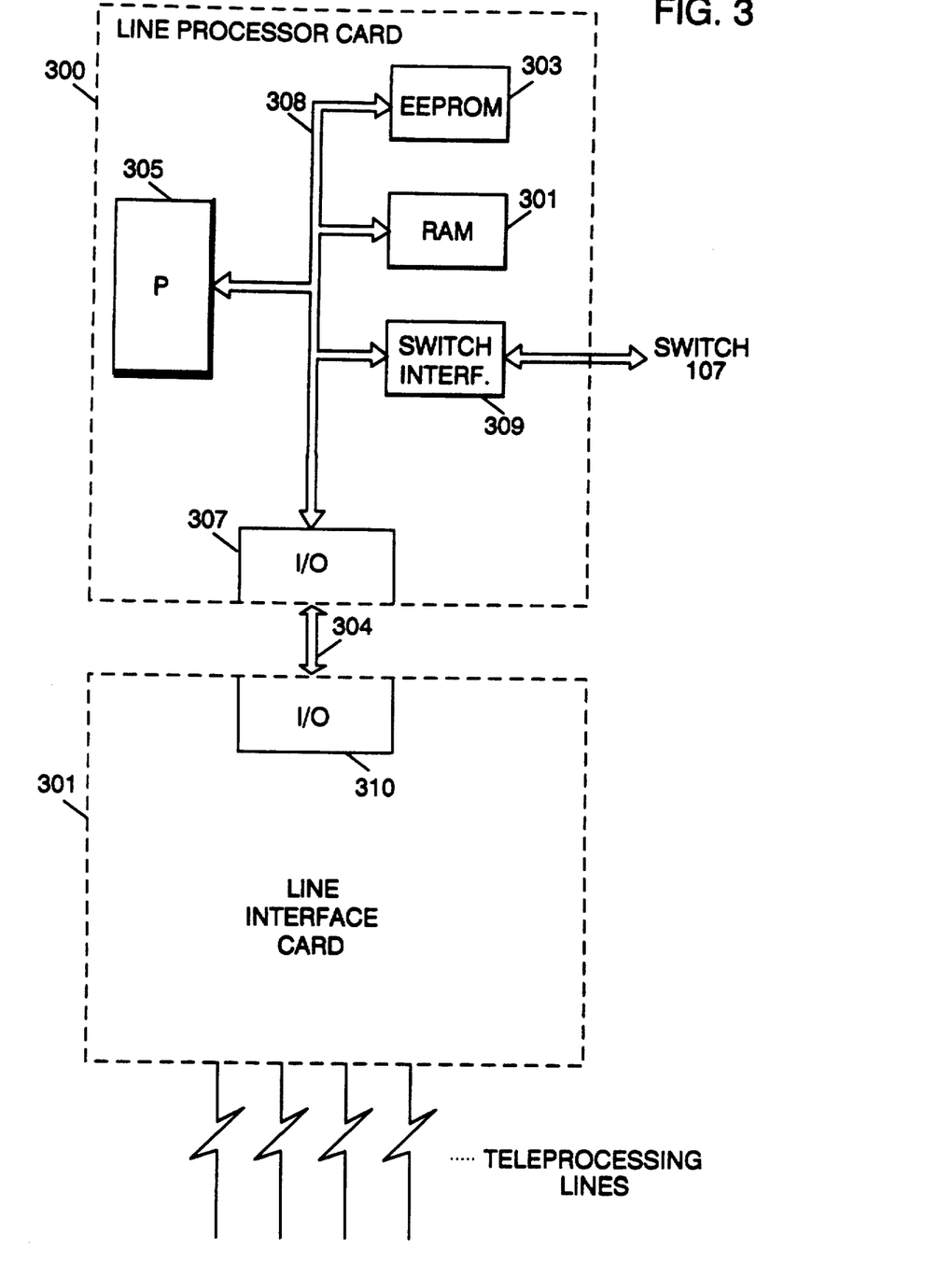
FIG. 3 shows the structure of the line adapter 104-i according to the present invention.

A' = H and J
B' = inverted B
C' = F and L
D' = inverted D
E' = C and N
F' = inverted F
G' = A and P
H' = inverted H
I' = I and P
J' = inverted J
K' = K and N
L' = inverted L
M' = M and N
N' = inverted N
O' = O and J
P' = inverted P FIG. 3 details the internal structure of a line adapter 104-i according to the present invention. Line adapter 104-i comprises a set of two distinctive cards: a first line processor card 300 and a second line interface card 301 which communicate with each other via a bus 304. Line processor card includes a processor 305 which is connected by means of a bus 308 to EEPROM 303 of small capacity, a large RAM storage 301, a switch interface 309, which is connected to the switching means 107 located in CCP 110, and to a I/O interface 307 which is connected to bus 304.

Line interface card 301 is connected to bus 304 by means of an I/O interface 310 and further includes the circuits and components which are used for adapting the line adapter 104-i to the particular physical medium which is considered: optical fiber, telephone line, a Local Area Network etc. . . In FIG. 3, the illustrated line interface card 301 is particularly adapted to allow the attachment of a plurality of teleprocessing lines and therefore has to include the components that are required for this purpose and which are well known to anyone skilled in the art, and particularly the components embodying a CCITT V24 interface allowing the connection of data circuit terminating equipment (DCE). EEPROM 303 includes a portion of elementary microcode which is required during an initialization period when the considered line adapter 104-i is reset in order to provide the transfer and the loading of the general application program from storage 101 into RAM 301. As mentioned above, this is used for the normal data communication session. The loading of the RAM 301 located in the line processor card of every line adapter 104-i with the particular general application program which is extracted from the unique storage 110 is to be performed without any data communication session. That loading is allowed at the completion of a set of checking and validation procedures which are detailed with respect to FIGS. 4-8 as described hereinafter.

Figure 4:
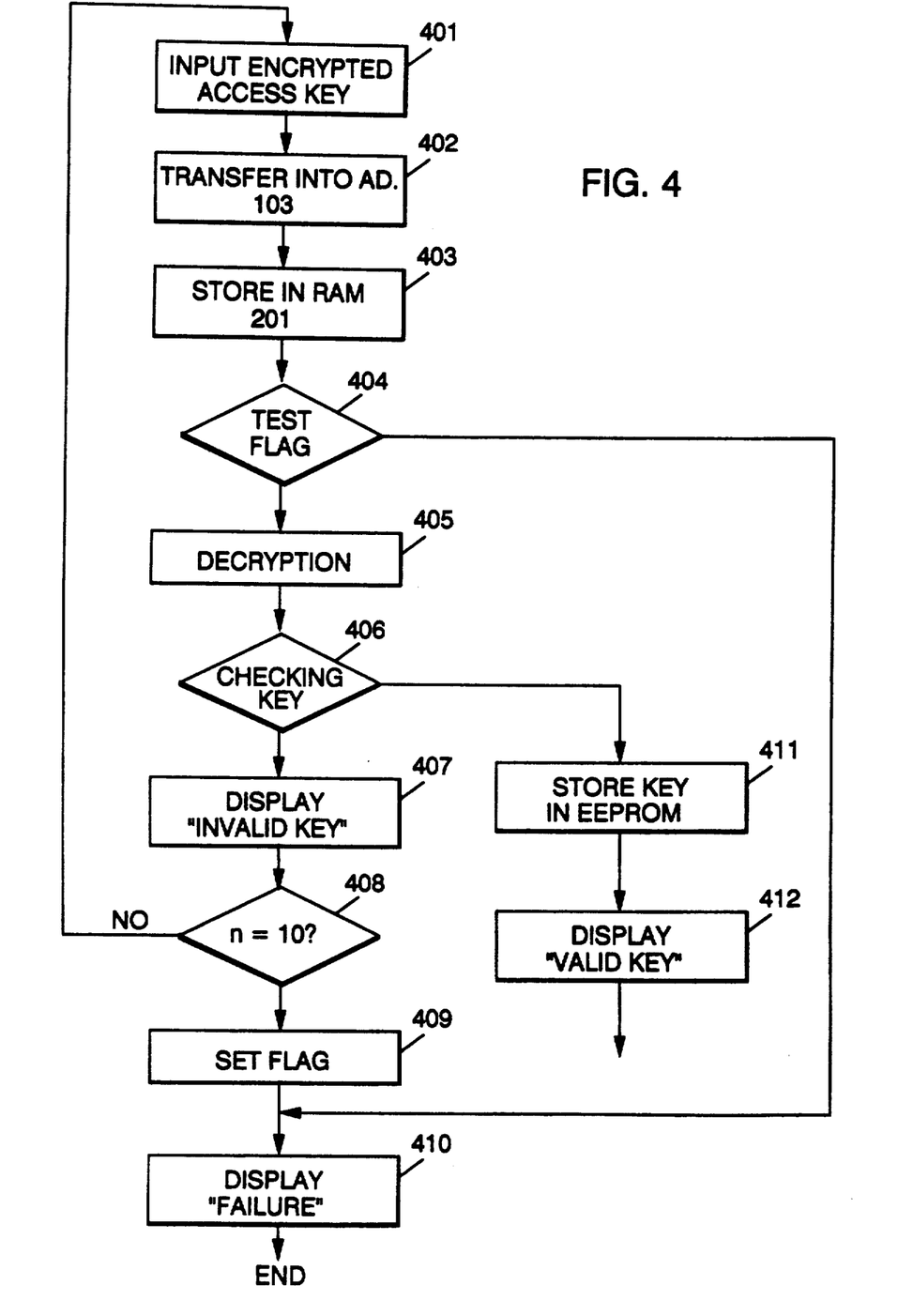
FIG. 4 is a flow chart of the key decryption and validation process in accordance with the present invention.

FIG. 4 details a flow chart of the key decryption and validation process which is performed prior to the loading of the RAM storages included in Line adapters 104-1, 104-2, 104-3 . . . The customer receives, with the communication controller product 110, an access key provided by the manufacturer which represents of the CCP 110 and also its authorized use. The access key is particularly shown in FIG. 5 and comprises some different fields. The access key comprises a first field 501 which corresponds to the serial number of the CCP 110. A second field 502 corresponds to a first specific type of line adapter 104-i, for instance an ISDN line adapter, and also comprises data relative to the maximum number of authorized ISDN lines which can be connected to that ISDN line adapter. A third field 503 corresponds to a second specific type of line adapter 104-i, for instance a LAN line adapter, and also comprises data relative to the maximum number of LAN line interface cards which are authorized etc. . .

Therefore, the access key accurately defines the communication controller product 110 and its authorized use. Before providing the customer with the above access key, the manufacturer performs an encryption process, which is the inverse of the decryption process which will be performed by adapter 103 as described hereinafter. With respect to FIG. 4 again, at the installation of the communication controller product, cards 210 and 220 are powered ON and an initialization procedure begins which particularly requires the inputting, the processing and the validation of the access key which is associated with CCP 110.

Firstly, the customer has to input, in Step 401, on the keyboard of control terminal 100 the encrypted access key he received from the manufacturer. In Step 402, the latter key is transferred via LAN network 102 to adapter 103 and received by processor 200 which stores it in RAM 201, as step 403. In Step 404, processor 200 tests an ERROR flag which is stored in EEPROM 202 to determine whether the decryption and validation procedure is allowed to continue. As will be seen below, the ERROR flag is set when several validation procedure have been tried and have always failed, thus indicating a general failure or a misuse of the system. In the latter case, the process proceeds directly to step 410 where processor 200 generates and transmits an error message to the display on panel 250 and to control terminal 100, thus informing the customer that the system requires an inspection.

Figure 5:
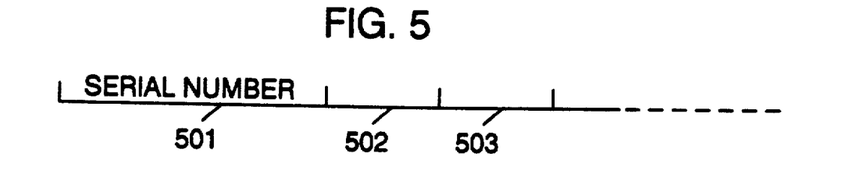
FIG. 5 illustrates the structure of an access key.

On the contrary, in the case when test 404 indicates that the flag is reset, then processor 200 performs in Step 405 a decryption process. This process involves two distinctive operations: firstly, processor 200 performs a first elementary software decryption process by means of a decryption routine existing in RAM 201 which has been loaded from storage 101 at the beginning of the initialization period. Then, processor 200 transmits the N-bit word resulting from that first software decryption process to the decryption circuit 223 located in card 220 by means of bus 212, I/O 213, bus 203, I/O 214 and bus 226. The latter N-bit word is then stored in register 222 and decrypted by logic circuit 204 which provides a fully decrypted N-bit word to the input of the register 221. The successive decryption processes which are performed firstly by the above software decryption routine stored in RAM 201 and then by logic circuit 223 provides processor 200 with the decrypted access key such as illustrated in FIG. 5.

Processor 200 completes the decryption process by storing the decrypted access key in RAM 201. In Step 405, processor 200 performs a comparison between the contents of the serial number field 501 of the stored decrypted key and the actual serial number of CCP 110 which was stored during the manufacturing process in EEPROM 202. If the content of the serial number field 501 does not match the actual serial data of CCP 110, processor 200 generates and transmits in Step 407 a message to the display of panel 250 and control terminal 100 to indicate that the key is invalid. Then in step 408, a counter is incremented and a test is performed to determine whether the key decryption and validation process has not been tried without success more than a predetermined fixed number of times equal to a number stored in EEPROM 202, for instance 10.

If the incrementing counter has not yet reached the value of the latter number, the process proceeds to step 401 again. On the contrary, if the decryption and validation process has failed more than that number, processor 200 proceeds to step 409 where it sets the ERROR flag in order to prevent any further attempt to decrypt and validate the access key.

Then the processor proceeds to step 410 to indicate to the user than an inspection of the system is required.

However, if the contents of the serial number field 501 do match the actual serial data of CCP 110, processor 200 stores the decrypted access key into EEPROM 202, step 411. Then in step 412 processor 200 generates and transmits a message to control terminal 100 via LAN 102 which indicates to the user that the access key has been recognized and that the validation process is completed.

As mentioned above, processor card 210 and power control and service card 220 are continuously powered ON while the remainder of the machine is powered ON only during effective communication sessions. However, it should be noticed that even in the case when cards 210 and 220 are powered-OFF, the error flag keeps its contents since it is loaded in EEPROM 202 and there cannot be reset by the customer. Moreover, since a part of the decryption process involves a decryption routine loaded in RAM 201 which is lost as soon as cards 210 and 220 are no longer supplied with DC current, the decryption process cannot be analyzed by unauthorized people. Indeed, assuming that Power Control and Service card is removed by an unauthorized person who wishes to analyze its content, and particularly that of the logic card 223, the power unit causes the general power-OFF of the whole machine, including processor card 210, which entails the loss of the decryption routine stored in RAM 201. Therefore, the decryption device according to the present invention creates a substantial protection against reverse engineering analysis. The decryption and validation process is involved at the installation step of the CCP 110 and at any time the nature and the number of line adapters 104-i is modified.

Figure 6:
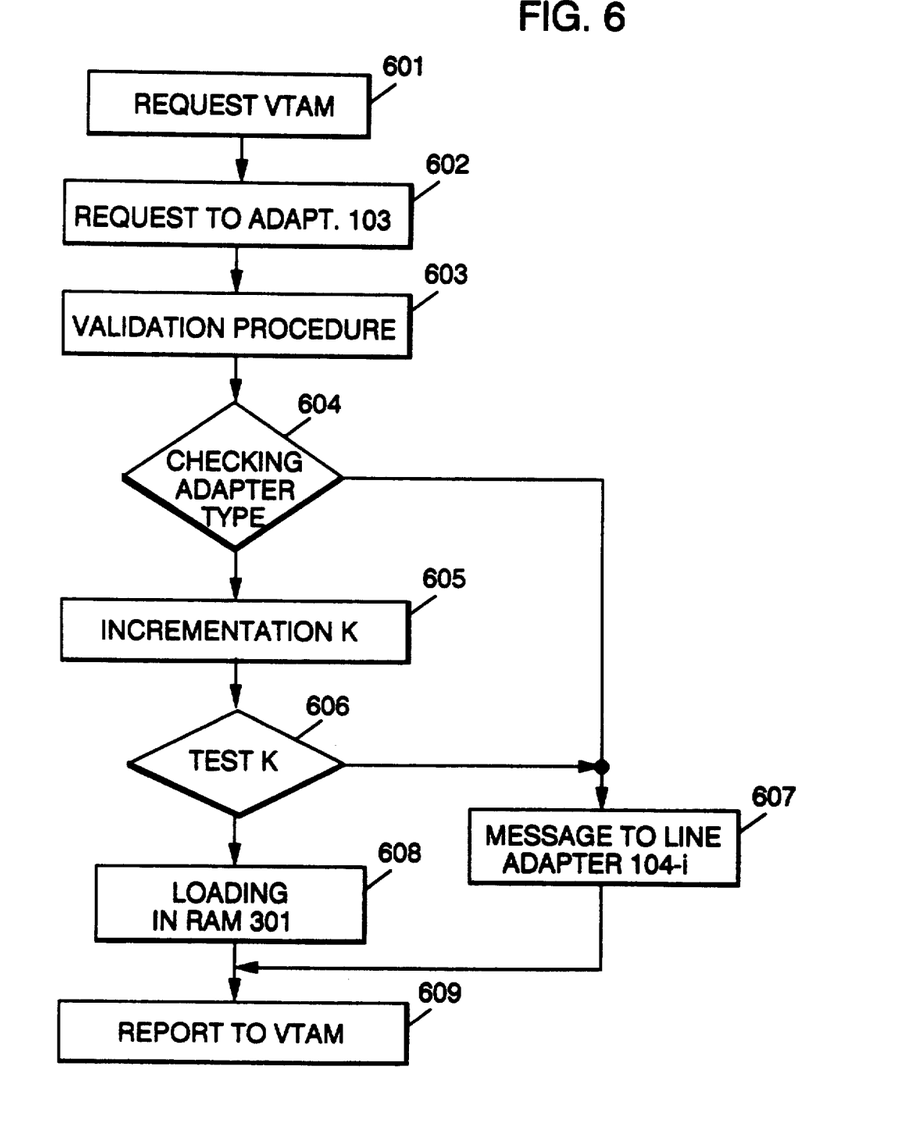
FIG. 6 is a flow chart of the loading process of the general application program into the RAM of every line adapter in accordance with the present invention.

FIG. 6 details the flow chart of the loading process which is involved in order to transfer and load the general application program in the RAM 301 located in one line adapter 104-i. When a determined line associated with a determined line adapter 104-i is to be activated, an activation request is generated by Host computer 105 and transmitted to CCP 110 in step 601. That activation request can either be automatically generated by the network control program (NCP/VTAM) which is running in host computer 105 or generated by an user from network control terminal 106.

Communication controller 110 receives the activation request and transmits it to the considered line adapter 104-i where it is received by processor 305 via switch interface 309 and bus 308. In Step 602, processor 305 generates a corresponding request which is transmitted via switch 107 to line adapter 103 to inform the processor 200 therein that a part of microcode, being the general application program corresponding to the considered line-adapter 104-i (ISDN, LAN, etc. . . ) should be transferred from disk storage 101 to the RAM located in the corresponding line adapter 104-i.

Processor 200 receives the latter request and initiates a validation procedure at step 603. For this purpose, processor 200 searches the decrypted access key which was stored in EEPROM 202 during the decryption and validation procedure of FIG. 4 and extracts the contents of the field in the decrypted access key which correspond to the type of line adapter considered. For instance, if host computer 105 has asked for the activation of an ISDN line, processor 200 extracts from the decrypted access key stored in EEPROM 202 the contents of the ISDN field in order to check in Step 604 whether the type of the line adapter 104-i corresponds to an authorized type of line adapter 104-i. In other words, it determines whether the user is authorized to activate an ISDN line and therefore transfers the ISDN general application program from storage 101 into line adapter 104-i. In the case where the requested type of line adapter 104 is not included in the field of the decrypted access key, the process proceeds to step 607 where processor 200 generates a message to line adapter 104-i indicating to the latter that the loading process cannot succeed. Then at step 609, a message is transmitted from CCP 110 to the network control program indicating to the latter that the activation of the considered line has not been performed.

On the contrary, if the type of the considered line adapter 104-i corresponds to the field of the decrypted access key stored in EEPROM 202, processor 200 goes to step 605 where it increments a counter K associated with that particular type of line adapter 104-i. Then, in step 606, the processor 200 extracts from the decrypted access key the number corresponding to the maximum number of line adapters of that specific type (ISDN in our example) which are authorized to be operating at the same time, and compares that number with the value of counter K. In the case where the value of K has been found to be equal to or less than the maximum number, processor 200 transmits a request to control terminal 100 via LAN 102 in order to ask the latter to transmit the general program application corresponding to the type of line adapter 104-i which is considered.

That general program application is then transferred through LAN 102, Line adapter 103, switching means 107 to the line adapter 104-i and directly loaded in RAM storage therein in, step 608. Then in step 609, a report message is transmitted to the network control program in the host computer 105 to inform the latter that the line activation process has succeeded. However, if the value of the K counter has been found to be greater than the maximum authorized number of line adapters 104-i of the same type, processor 200 goes to step 607 where it generates and transmits a message to the considered line adapter 104-i in order to inform it that the request cannot be satisfied and that the loading of the requested general program application will not be performed. Then, the process proceeds to step 609 where a report message is transmitted to the network control program in host 105 to inform it that the activation procedure failed.

It should be noticed that the decryption and validation procedures performed in accordance with the present invention are performed locally and do not require any further processing from the network control program running into host computer 105. Rather, NCP has only to request the activation of one line and to wait for the report message generated and transmitted from CCP 110 indicating that the activation of the line has succeeded or failed.

We claim:

1. A communication controller product CCP (110) including line adapters (104-i) each having a storage (301) which is loaded with a general application program during an initialization phase, said line adapters (104-i) allowing the attachment to and the communication with different telecommunication entities (120, 121), said CCP (110) being further connected by means of a control adapter (103) to a local control terminal (110) which is associated with a storage (101) for storing different general application programs which are likely to be required by said line adapters (104-i), characterized in that said CCP (110) further includes:
    means (202) for storing an access key comprising data relative to the type and the number of line adapters (104-i) of each type which are authorized to be loaded with the general application program transferred from the storage (101) associated with said control terminal (100),
    means (200, 201, 202) for checking whether a loading request received from an adapter complies with the contents of said stored access key; and means responsive to said checking for preventing the loading of an unauthorized line adapter.

2. A communication controller according to claim 1 characterized in that:
    said access key comprises data relative to the serial number of the communication controller.

3. A communication controller according to claim 1 or 2 characterized in that:
    it further includes means for performing a decryption process of said access key.

4. A communication controller according to claim 3 characterized in that:
    it further comprises a storage (201) for storing a first decryption routine and a wired circuit (223) for performing a second decryption process, said first and second decryption process being performed successively.

5. A communication controller according to claim 4 characterized in that:
    said storage (201) is a RAM storage and said wired logic circuit (223) is located on a card which controls the powering ON of the communication controller.

6. A method for performing the loading of a line adapter card (104-i) which is attached to a communication controller product CCP (110) and which allows the connection of a telecommunication entity (130, 121), said line adapter being loaded during an initialization phase with a corresponding general application program which exists in a storage (101) associated with a control terminal (100) and which can be transferred and loaded into said line adapter (104-i), said communication controller (110) being connected to a host computer (105) having a network control program running therein, characterized in that said method involves steps of:
    receiving a request from a requesting line adapter (104-i) to be loaded with the corresponding general application program,
    checking whether the requesting line adapter is included in a list of line adapters which are authorized to be loaded with their corresponding general program application,
    checking whether the number of already existing line adapters (104-i) which are of the same type as the said requested line adapter does not exceed a predetermined value,
    preventing the loading of the requesting line adapter (104-i) in the case when any of the preceding conditions is not satisfied.

7. A method according to claim 6 characterized in that it includes the step of:
    storing an access key comprising data indicating the types and the number of line adapters which are allowed to be loaded from the storage (101) which is associated with said terminal adapter, and said access key also comprising data relating to the serial number of the communication controller.

8. A method according to claim 7 characterized in that it further includes the step of:

performing a decryption process through a first software decryption routine and through a hardware circuit (223), said hardware circuit being located on a card which controls the powering ON of the communication controller.

9. A method according to claim 7 or 8 characterized in that it includes the step of:

comparing the data relating to the serial number of thereof communication controller with the actual serial number thereof and for preventing any loading process in case of mismatch.

* * * * *